United States Patent Office 3,277,976
Patented Oct. 11, 1966

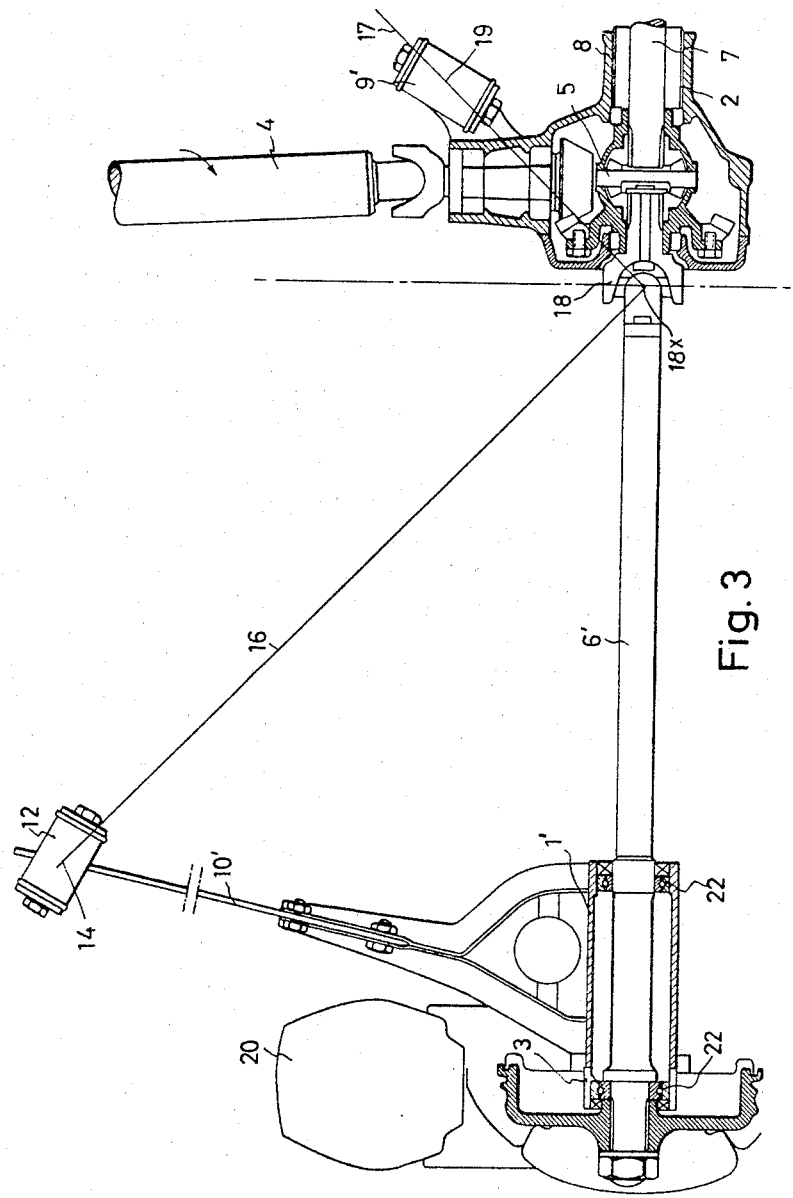

3,277,976
AUTOMOBILE WHEEL SUSPENSION
Alfred Rist, Cologne-Weidenpesch, Germany, assignor to Ford-Werke Aktiengesellschaft, Cologne-Niehl, Germany
Filed July 17, 1964, Ser. No. 383,284
Claims priority, application Germany, July 25, 1963, F 40,338
2 Claims. (Cl. 180—73)

This invention concerns a wheel suspension for the rear drive wheels of an automobile in which one of the rear axles is provided with a pendulum type mounting.

Heretofore rear drive wheel constructions have been provided in which one of the axles has been fabricated with a pendulum type mounting. However, such constructions have been relatively expensive to fabricate.

An object of the invention is to provide a wheel suspension which can be manufactured at low cost.

In accordance with the invention a construction is provided in which one rear axle housing or tube is rigidly attached to the differential gear housing. The other rear axle tube is carried by a pendulum joint positioned at the differential gear housing. The pendulum mounted axle tube carries a non-extendable axle. Longitudinal support of the axle tubes is provided by swinging arms attached thereto inwardly of the wheel bearings. The differential housing is positioned somewhat off center so that the center of the pivotable axis of the pendulum axle is at the center line of the vehicle and at the center line of intersecting circles having their centers positioned at the supporting points of the swinging arms. The intersecting radii of these circles are termed the swinging axes. The supporting bearings for the swinging arms may be either parallel with or inclined to the automobile center line, preferably inclined with respect thereto. The bearings are provided with elastic bushings.

Because the rear axle housing or tube for the swinging axle has no support bearing, the movement of the drive shaft and of the axle must be absorbed by the swinging axle. The forces resulting from the movement of the pendulum axle must be counteracted so as to be balanced without reaction occurring against the automobile frame. In order to achieve this result the swinging axes must make an angle of about 30–45° with respect to the center line of the automobile.

The braking force of the automobile is absorbed through the swinging arms depending upon the angle of the swinging axes of the axles with respect to the center line of the automobile, and is so directed as to work against a lifting up of the body during a braking action and a lowering of the body during forward acceleration.

In the drawings:

FIGURE 3 is a top view of a somewhat modified wheel construction in accordance with the invention.

Figure 1:
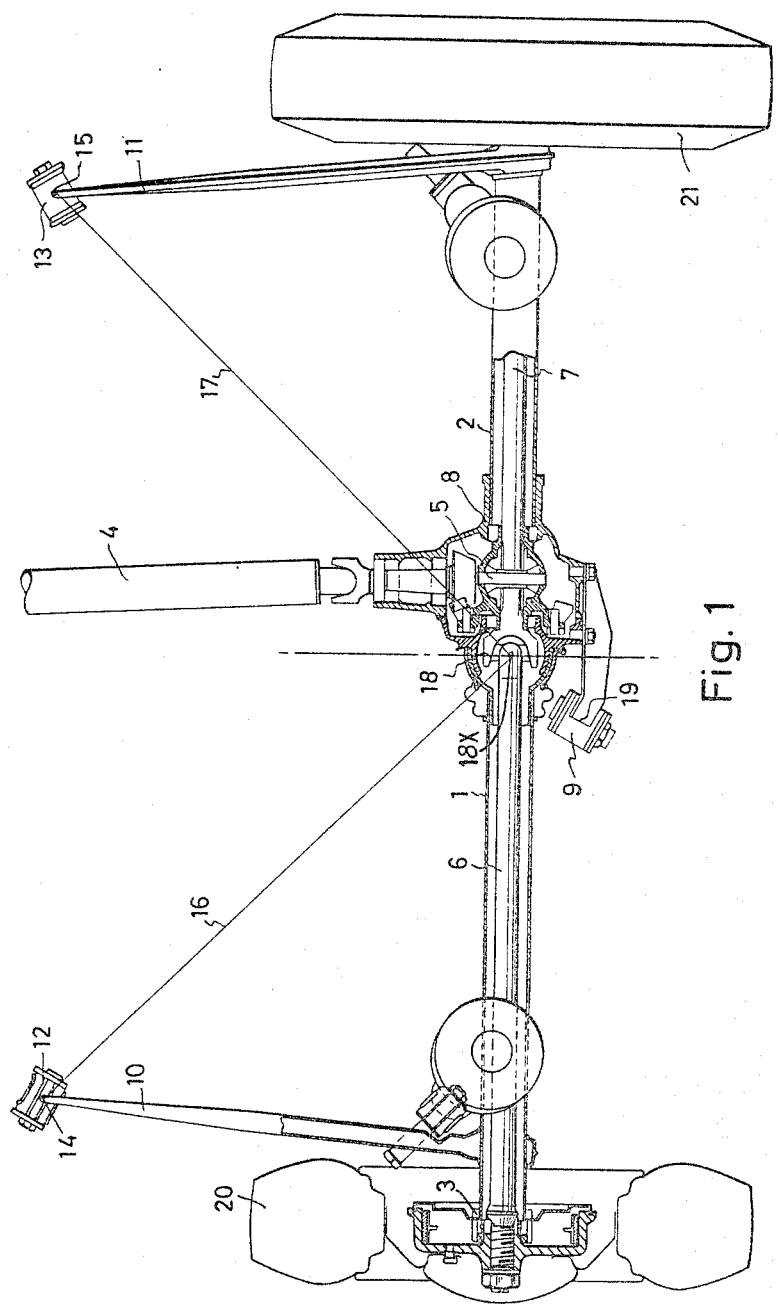
FIGURE 1 is a top view of a wheel suspension in accordance with the invention.

Referring to the drawings there is shown in FIGURE 1 a top view of an automobile rear axle construction in accordance with the invention.

Axle tube or housing sections 1 and 2 are provided with wheel bearings 3 at their outer ends. A drive shaft 4 is provided terminating at its rear end in a differential gear 5 providing rotation for axles 6 and 7. The axle tube 2 is rigidly attached to the differential gear housing 8 while the axle tube 1 is swingingly attached to the differential gear housing by a pendulum joint 18. The differential gear housing is swingingly attached to the frame by a bearing 9. At the outer end of the axle tubes 1 and 2 and inwardly of the wheel bearings 3 are attached swinging arms 10 and 11 which have their other ends fastened in bearings 12 and 13 secured to the automobile frame. The center lines or axes of the bearings 12 and 13 lie respectively on the swinging axes 16 and 17. It will be noted that the swinging axes 16 and 17 intersect in the center of the pendulum joint 18 as indicated at 18 X and that the center line 19 of bearing 9 lies along the swinging axis 17, and, as shown in FIGURE 1, is positioned rearwardly of the rear axle. It will be noted also that the wheels 20 and 21 swing around the axles 16 and 17.

Figure 2:
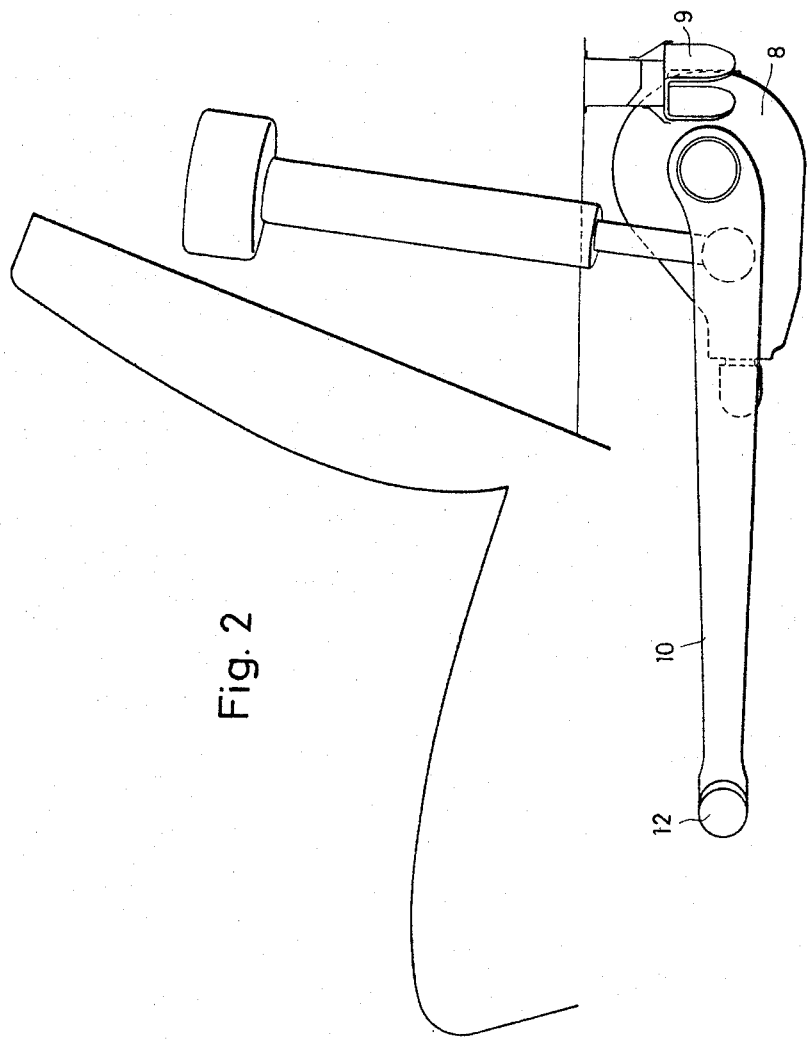
FIGURE 2 is a side view showing a portion of the construction of FIGURE 1.

IN FIGURE 3 there is shown a somewhat modified form of the invention in which the bearing 9' is positioned ahead of the rear axle but along the swinging axis 17. In this construction the lefthand axle tube 1' is shortened and carries the bearings 22 supporting the axle 6'. The axle tube 1' carries at its outer end the wheel bearings 3 and inwardly of the wheel bearings is positioned the swinging arm 10'. The righthand side of the wheel suspension for the example shown in FIGURE 3 matches that shown as in the case for the examples shown in FIGURES 1 and 2.

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

I claim:

1. An automobile rear wheel suspension of the type with a single joint swinging axle for the wheels comprising a differential gear housing, a fixed axle tube extending from the differential gear housing at one side thereof, a pendulum joint at the other side of the differential gear housing, a swingable axle tube supported by said pendulum joint normally in axial alignment therewith, a frame having a longitudinal axis, a pair of swinging arm bearing members attached to the frame, a pair of swinging arms carried at one end in said bearing members and attached at their other ends to the axle tubes, the pendulum joint positioned in the center of the longitudinal axis of the automobile, a differential gear housing bearing member attached to the frame, and pivotable means supporting the differential housing in the differential gear housing bearing member, the differential gear housing bearing member positioned on a line extending through the longitudinal axis at the pendulum joint and through one of said swinging arm bearing members.

2. An automobile rear wheel suspension according to claim 1 in which said differential housing bearing member is positioned at the rear of said differential housing.

References Cited by the Examiner
UNITED STATES PATENTS

| | | | |
|---|---|---|---|
| 2,417,325 | 3/1947 | Roos | 180—73 |
| 2,818,128 | 12/1957 | Uhlenhaut et al. | 180—73 |
| 2,843,214 | 7/1958 | Muller | 180—73 |

A. HARRY LEVY, *Primary Examiner.*